United States Patent [19]

Atobe et al.

[11] Patent Number: 4,607,377

[45] Date of Patent: Aug. 19, 1986

[54] TRANSVERSAL TYPE EQUALIZER APPARATUS

[75] Inventors: Masaaki Atobe; Susumu Otani, both of Tokyo, Japan

[73] Assignee: NEC Corporation, Tokyo, Japan

[21] Appl. No.: 603,818

[22] Filed: Apr. 25, 1984

[30] Foreign Application Priority Data

Apr. 26, 1983 [JP] Japan .................................. 58-73284
Apr. 26, 1983 [JP] Japan .................................. 58-73285

[51] Int. Cl.[4] ............................................. H04B 3/04
[52] U.S. Cl. ........................................ 375/14; 375/15; 333/18
[58] Field of Search .................. 364/724, 728; 375/12, 375/14, 15; 333/18

[56] References Cited

U.S. PATENT DOCUMENTS

| | | | |
|---|---|---|---|
| 3,914,691 | 10/1975 | Meadors, Jr. ......................... | 333/18 |
| 4,285,061 | 8/1981 | Ho ....................................... | 364/724 |
| 4,344,177 | 8/1982 | Kustka ................................ | 364/724 |
| 4,475,211 | 10/1984 | Mattis, Jr. et al. .................. | 333/18 |
| 4,484,299 | 11/1984 | Lambourn et al. ................. | 364/724 |

Primary Examiner—Benedict V. Safourek
Attorney, Agent, or Firm—Sughrue, Mion, Zinn, Macpeak, and Seas

[57] ABSTRACT

Optimum tap coefficients corresponding to equalization characteristics are stored in a memory circuit and when an equalization characteristics is designated, an optimum tap coefficient is read out of the memory circuit and a transversal type equalizer is controlled by the read-out optimum tap coefficient. According to a modified embodiment, where a tap coefficient for a combined characteristic based on a combination of a plurality of transmission characteristics is necessary, a convolution operation of the tap coefficients for respective transmission characteristics is effected to determine a new tap coefficient which is used to set taps of the transversal type equalizer.

1 Claim, 4 Drawing Figures

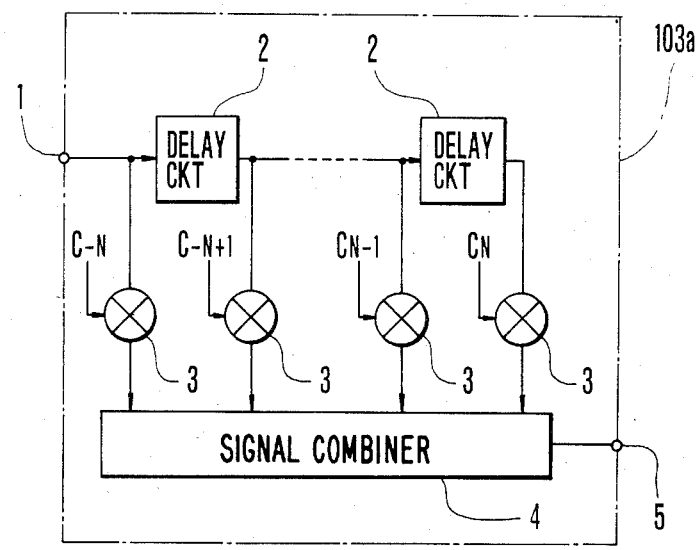
F I G. 1
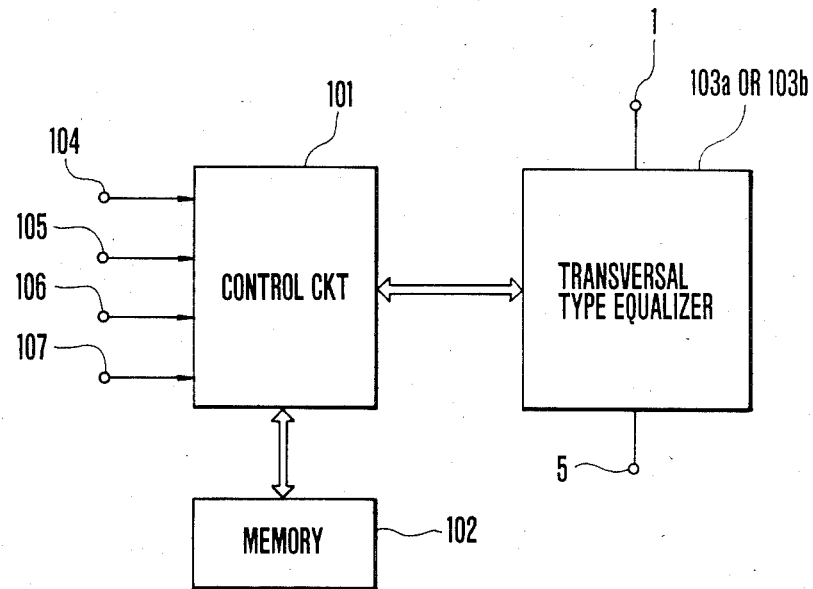
F I G. 2

TRANSVERSAL TYPE EQUALIZER APPARATUS

BACKGROUND OF THE INVENTION

This invention relates to a transversal type equalizer apparatus utilized for communication systems or lines, and more particularly a transversal type equalizer apparatus provided with a control circuit for setting an optimum tap coefficient of an equalizer.

Generally, in communication systems, such transmission distortions as amplitude distortion, delay distortion or the like are caused owing to imperfectness of devices utilized for communication. For this reason, in order to maintain a stable communication system, a certain type of distortion equalization is necessary.

Especially, in a satellite communication system, a high power amplifier is mounted on a satellite. However, since the type is of a non-linear amplifier, equalization of transmission distortion carried out in either the transmitting apparatus or receiving apparatus is insufficient to maintain a stable communication state, as well known in the art.

For this reason, in a communication system including a non-linear amplifier, independent equalizers are provided for the transmitting and receiving apparatus to perform independent transmission path equalization before and after the non-linear amplifier. One example of the distortion equalizer is a transversal type equalizer.

To have better understanding, one example of the construction of a transversal type equalizer, to which the present invention is applicable, will be described with reference to FIG. 1. It comprises a signal input terminal 1, 2N delay circuits 2 each having a predetermined delay time $T_0$, (2N+1) complex multipliers 3, a signal combiner 4 in the form of an adder circuit and an output terminal 5. Complex signals $C_{-N}$, $C_{-N+1}$ ... $C_{N-1}$, and $C_N$ representing tap coefficients or tap gain control signals, where N represents a positive interger, are applied to the complex multipliers. The frequency characteristic of this equalizer is shown by the following equation:

$$T(\omega) = \sum_{n=-N}^{N} C_n \cdot e^{-jn\omega T_0} \quad (1)$$

With this equalizer, it is possible to vary the frequency characteristic without interrupting the signal by varying the tap coefficients $C_n$ and hence, this equalizer is effective for use as an equalizer in a communication circuit. As a criterion for evaluating the equalizing effect for the circuit distortion, flatness of the frequency characteristics (amplitude, delay) is generally used. In a circuit in which it is difficult to correctly grasp the equalization characteristic owing to the limit of a measuring system, a method is used wherein the circuit distortion is equalized so as to make optimum the quality of the output signal of a receiver. In such a circuit, the above-described equalizer is effective because the circuit can be equalized without interrupting signals.

One of the serious problems in the operation of the transversed type equalizer is encountered in selecting respective tap coefficients $C_n$ so that a desired characteristic $T(\omega)$ of the equalizer can be obtained. Especially, where the equalizer is used as an amplitude or delay equalizer, there is no effective measure to know its characteristic when the circuit is used in the on-line mode. Even if there is a measure for knowing the characteristic, the combinations of respective tap coefficients $C_n$ are numerous with the result that the measure for equalization can not be automated for the equalizer on the transmission side. This requires a large adjusting time. To cope with this difficulty, another measure is conceivable in which respective tap coefficients are precalculated and stored. By the latter measure, however, an extremely large number of memory devices are necessary, thus increasing the cost of the system.

Taking a TDMA (time division multiple access) satellite communication system, for instance, the equalizing characteristic will be as follows:

| Parabolic group delay | 0.00 to $(-0.025)$ns/MHz$^2$ |
|---|---|
| Linear delay | 0.00 to $(\pm 0.25)$ns/MHz |
| Linear amplitude | 0.00 to $(\pm 0.05)$dB/MHz |
| Parabolic amplitude | 0.00 to $(\pm 0.002)$dB/MHz$^2$ |

In this system, the transmission path bandwidth is about ±40 Mz so that it is necessary to sufficiently equalize in this range. However, the range of equalization in ±30 Mz, is 0 to ($-22.5$)ns for the parabolic group delay, ±7.5 ns for the linear group delay, +1.5 dB for the linear amplitude and ±1.8 dB for the parabolic amplitude. It is not always necessary to provide continous correction within this range, and it is known that even when the residual distortion after equalization is considered, the code error rate of the demodulated signal after the correction by means of the transversal type equalizer can be maintained in a sufficient expected-value range if the correction could be made by 0.1 dB for the amplitude characteristic, and every 0.5 ns or 1 ns for the group delay characteristic. In this case, for each tap, 46 words are necessary for the parabolic group delay, 31 words for the linear group delay, 31 words for the linear amplitude, and 37 words for the parabolic amplitude. Where all combinations of respective characteristics are to be equalized, at least 45×30×30×36=1458000 words are necessary, but the limit of the number of memory words now being used is 8K words (where a 64K ROM is used.)

For this reason, the aforementioned system or a so-called memory table reference system in which all of the previously calculated tap coefficients are stored in the memory device and they are read out when necessary is difficult to realize through currently available technique.

On the other hand, a further measure may be considered wherein a necessary number of optimum tap coefficients are calculated when desired, but such a measure is also difficult to realize from the standpoint of calculation time and memory size.

SUMMARY OF THE INVENTION

Accordingly, it is an object of this invention to provide a novel transversal type equalizer apparatus capable of setting optimum tap coefficients by making use of the presently available technical level.

Another object of this invention is to provide a novel, highly reliable and inexpensive transversal type equalizer apparatus capable of readily setting the tap coefficients in a short time.

To accomplish the above objects, according to the present invention, there is provided a transversal type equalizer apparatus comprising:

a transversal type equalizer including signal input and output terminals, delay circuit series means connected to the signal input terminal and having a plurality of delay circuits of a predetermined delay time, and first coefficient relating and combining means for relating coefficients corresponding to desired equalizing characteristics to non-delayed and delayed input signals, combining related results and providing a combined result to the signal output terminal;

memory means for storing the coefficients corresponding to the equalizing characteristics; and control circuit means for reading the coefficients corresponding to the desired equalizing characteristics from the memory means and applying read-out coefficients to the first coefficient relating and combining means of the transversal type equalizer.

BRIEF DESCRIPTION OF THE DRAWINGS

In the accompany drawings:

FIG. 1 is a block diagram showing a transversal type equalizer to which the present invention is applicable;

FIG. 2 is a block diagram showing one embodiment of a transversal type equalizer apparatus according to this invention;

DESCRIPTION OF PREFERRED EMBODIMENTS

FIG. 2 shows, in block form, a preferred embodiment of transversal type equalizer apparatus according to this invention.

Figure 4:
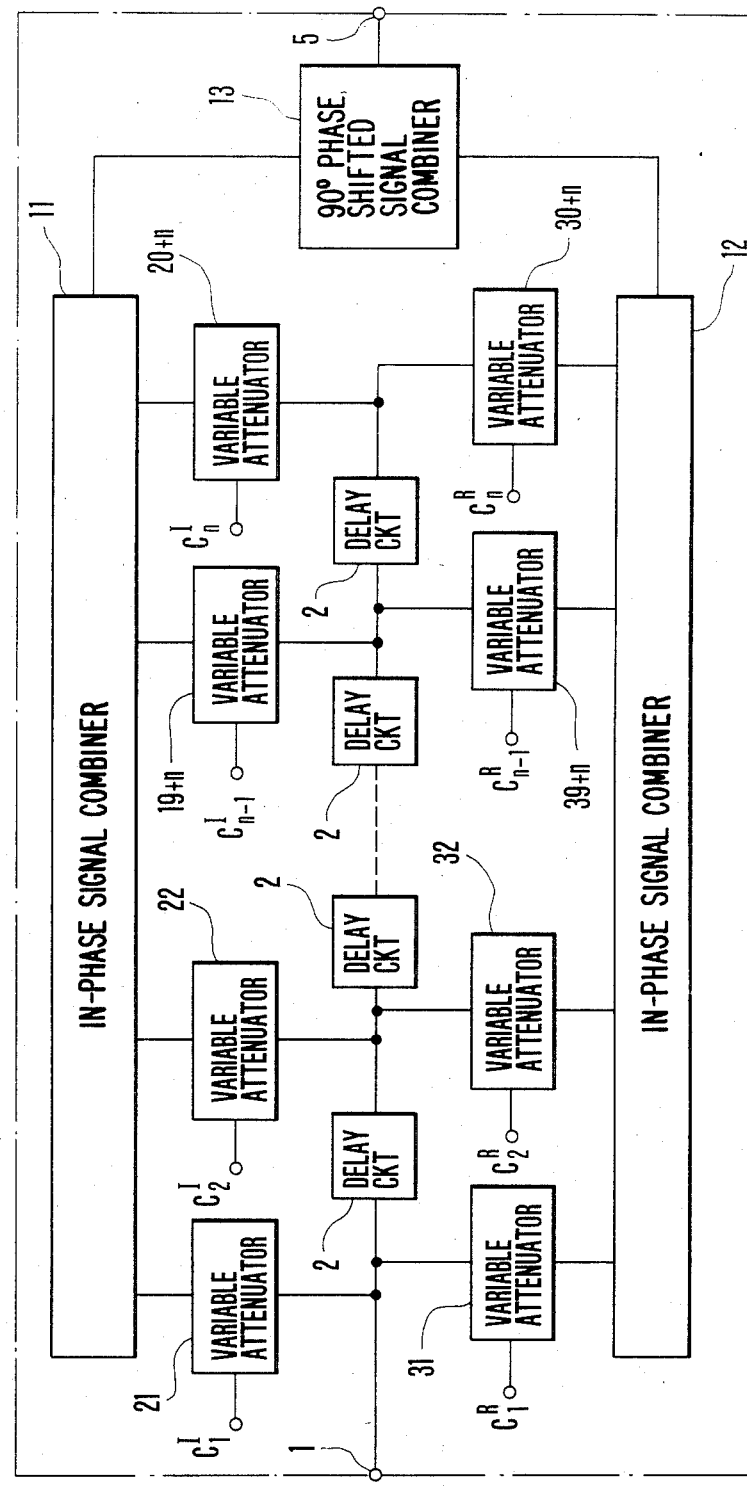
FIG. 4 is a block diagram showing another transversal type equalizer to which the present invention is applicable.

Referring to FIG. 2, the apparatus comprises a control circuit 101, a memory circuit 102, a transversal type equalizer 103a shown in FIG. 1 or 103b shown in FIG. 4 and terminals 104 to 107 for designating equalizing characteristics of which terminal 104 is used to designate a parabolic group delay characteristic, terminal 105 a linear group delay characteristic, terminal 106 a linear amplitude characteristic, and terminal 107 a parabolic amplitude characteristic.

With the apparatus shown in FIG. 2, when terminals 104 to 107 are supplied with designations for the desired equalizing characteristics, the control circuit 101 sequentially reads out tap coefficients commensurate with the given equalizing characteristics from the memory circuits 102 and supplies the read-out tap coefficients to the transversal type equalizer 103a or 103b. As a consequence, the transversal type equalizer 103a or 103b is controlled in accordance with the supplied tap coefficients to set desired equalizing characteristics.

Figure 3:
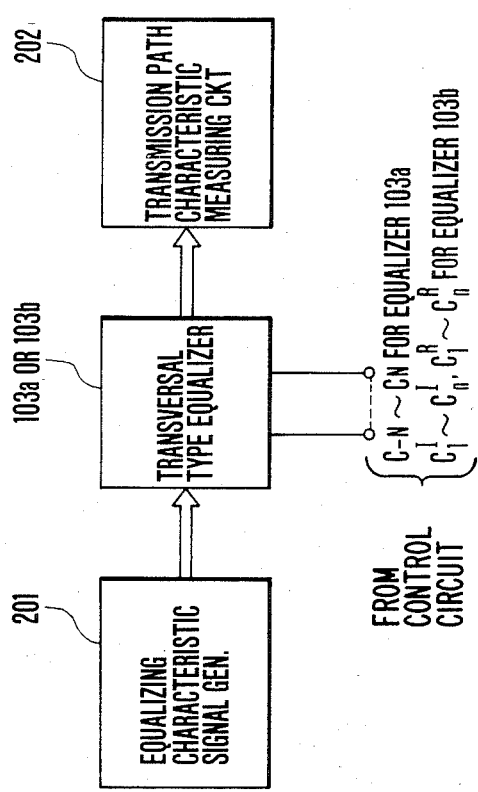
FIG. 3 is a block diagram showing a measuring system for determining the tap coefficient.

In this case, the tap coefficients to be stored in the memory circuit 102 are determined in a manner as will be described with reference to FIG. 3 which shows one example of a measuring system for determining optimum tap coefficients. The measuring system shown in FIG. 3 is constituted by an equalizing characteristic signal generator 201, the transversal type equalizer 103a or 103b and a transmission path characteristic measuring circuit 202. In this measuring system, the tap coefficients $C_{-N}$ to $C_N$ for equalizer 103a and $C_1^I$ to $C_n^I$ and $C_1^R$ to $C_n^R$ for equalizer 103b supplied to the transversal type equalizer 103a or 103b are adjusted such that the transmission path characteristic which is observed at the transmission path characteristic measuring circuit 202 can be flat. The tap coefficients $C_{-N}$ to $C_N$ and $C_1^I$ to $C_n^I$ and $C_1^R$ to $C_n^R$ are stored in the memory circuit 102 as the tap coefficients corresponding to equalizing characteristics of the transmission path. Furthermore, respective equalizing characteristics are processed in the same manner. In an application of teachings of this invention to the equalizer of FIG. 1, when signals that designate amounts of equalization of the characteristics to be equalized are inputted to terminals 104 to 107, the control circuit 101 reads from the memory circuit 102 tap coefficients corresponding to the designated data. When only one characteristic is designated, for example, only the parabolic group delay is designated, the control circuit 101 supplies the tap coefficient of 102, without modification, to the equalizer 103a.

When two types of characteristics are designated, the control circuit 101 executes the convolution operation of tap coefficients corresponding to respective characteristics read out of the memory circuit 102 to obtain a new tap coefficient.

Let us explain this by taking the parabolic group delay and the linear group delay, for instance. The overall transmission characteristic $T(\omega)$ is given by the product of $T_1(\omega)$ and $T_2(\omega)$ where $T_1(\omega)$ represents the transmission characteristic of the parabolic group delay, and $T_2(\omega)$ that of the linear group delay. It is well known that, along a time axis, an overall impulse response can be obtained from a convolution integration of respective impulse responses. This is indicated by the following equation:

$$h(t) = \int_{-\infty}^{\infty} h_1(u) h_2(t - u) du \qquad (2)$$

where $h(t)$, $h_1(t)$, $h_2(t)$ are inverse Fourier transforms of $T(\omega)$, $T_1(\omega)$ and $T_2(\omega)$. Equation (2) can be reduced to, $$h(t) = \sum_{n=-N}^{N} C_n \delta(t - nT_0) \qquad (3)$$

$$h_1(t) = \sum_{n=-M}^{M} C_{1n} \delta(t - nT_0) \qquad (4)$$

$$h_2(t) = \sum_{n=-L}^{L} C_{2n} \delta(t - nT_0) \qquad (5)$$

where N, M and L are positive intergers. By substituting equation (2) into equation (5), we obtain:

$$h(t) = \int_{-\infty}^{\infty} h_1(u) \sum_{n=-L}^{L} C_{2n} \delta(t - u - nT_0) du \qquad (6)$$

$$= \sum_{n=-L}^{L} C_{2n} h_1(t - nT_0)$$

By substituting equation (6) into equation (4), we obtain:

$$h(t) = \sum_{n=-L}^{L} C_{2n} \sum_{m=-M}^{M} C_{1m} \delta[t - (n + m)T_0] \qquad (7)$$

By substituting equation (3) into equation (7), we obtain:

$$\sum_{i=-N}^{N} C_i \delta(t - iT_0) = \sum_{n=-L}^{L} \sum_{m=-M}^{M} C_1 m C_2 n \delta[t - n + m)T_0] \quad (8)$$

When comparing the coefficients of both sides, we obtain:

$$C_i = \sum_{n=-L}^{L} \sum_{m=-M}^{M} C_1 m \, C_2 n \quad (9)$$

Then, by putting $i = n + m$, we obtain:

$$C_i = \sum_{n=-L}^{L} C_1(i - n) C_2 n \quad (10)$$

provided that $C_{1m} = 0$ for ($|m| > L+1$) and $C_{2m} = 0$ for ($|m| > M+1$) are held. The operation of equation (10) can readily be made with a commercial microprocessor so that even when two characteristics are designated at the terminals 104 to 107, a new tap coefficient can be calculated with present day technique. By supplying the new tap coefficient thus calculated for taps $C_{-N}$, $C_{-N+1}, \ldots, C_N$ of the transversal type equalizer 103a shown in FIG. 1, optimum equalization can be assured.

Where three or more types of characteristics are designated, a new tap coefficient is first determined for two types of characteristics and the final tap coefficient is determined in accordance with the new tap coefficient and remaining characteristics.

FIG. 4 shows another equalizer to which teachings of this invention is applicable. The equalizer shown comprises n delay circuits 2, each causing a definite time delay, in-phase signal combiners 11 and 12, a 90° phase shifted signal synthesizer 13, variable attenuators 21 to (20+n) and 31 to (30+n), the amounts of attenuation thereof being controlled by tap coefficients $C_1^I$ to $C_n^I$, $C_1^R$ to $C_n^R$ respectively, an input terminal 1 and an output terminal 5. With this equalizer, the calculation of equation (1) can be operated by the variable attenuators so as to control the transmission path characteristics.

The control circuit 101 which reads out designated tap coefficients from the memory circuit 102 and feeds back the read-out tap coefficients to the control elements of the transversal type equalizer 103a or 103b can readily be realized by using a microprocessor (CPU) or the like utilizing a program. Where such a microprocessor is used, it is possible not only to execute the operation described above, but also to control an alarm display when a designated distortion characteristic exceeds a predetermined range or pass loss and pass delay with programs, thus increasing additional performances.

It should be understood that it is not always necessary to determine the tap coefficient by using a measuring system that gives a quasi equalizing characteristic and the tap coefficient can also be determined by a computer simulation equivalent to the measuring system described above.

As described above, in the transversal type equalizer apparatus according to this invention, optimum tap coefficients commensurate with the equalizing characteristics are stored in a memory circuit and the tap coefficients are read out of the memory circuit when an equalizing characteristic is given so that the setting can be made readily in a short time. Moreover, as its construction is simple, its reliability is high and it can be manufactured economically. Specifically, when tap coefficients of a plurality of characteristics are read out, the convolution operation of the read out tap coefficient are executed to determine a new tap coefficient. Accordingly, it is possible to effect an optimum equalization in a short time with a memory device having a small capacity, hence simple construction.

What is claimed is:

1. A transversal type equalizer apparatus comprising:
    a transversal type equalizer including signal input and output terminals, delay circuit series means connected to said signal input terminal and having a plurality of delay circuits of a predetermined delay time, and first coefficient relating and combining means for relating coefficients corresponding to desired equalizing characteristics to non-delayed and delayed input signals, combining the result of said coefficient and input signal relating and providing said combined result to said signal output terminal, said first coefficient relating and combining means comprising a signal combiner in the form of an adder and multipliers, said multipliers being connected between the signal combiner and input and output terminals of the respective delay circuits and being supplied with said coefficients;
    memory means for storing the coefficients corresponding to the equalizing characteristics; and
    control circuit means for reading said coefficients corresponding to said desired equalizing characteristics from said memory means and applying read-out coefficients to said first coefficient relating and combining means of said transversal type equalizer;
    said control circuit means directly using the coefficient read out of said memory means for determining the coefficient corresponding to a single transmission characteristic and performing a convolution operation of a plurality of transmission characteristics in order to determine the coefficient corresponding to the plurality of transmission characteristics.

* * * * *

UNITED STATES PATENT AND TRADEMARK OFFICE
CERTIFICATE OF CORRECTION

PATENT NO.   : 4,607,377
DATED        : August 19, 1986
INVENTOR(S)  : Masaaki Atobe; Susumu Otani It is certified that error appears in the above-identified patent and that said Letters Patent is hereby corrected as shown below:

Column 1, equation (1) the occurance "$C_n \cdot e^{-jnwT0}$ should read --$C_n \cdot e^{-jnwT_0}$--

Column 5, line 36, delete "synthesizer" and insert --combiner--

Signed and Sealed this

Tenth Day of February, 1987

Attest:

DONALD J. QUIGG

*Attesting Officer*   *Commissioner of Patents and Trademarks*